United States Patent
Lee et al.

(10) Patent No.: US 9,416,007 B2
(45) Date of Patent: Aug. 16, 2016

(54) HIGH-PURITY GAS PRODUCTION APPARATUS AND PRODUCTION METHOD THEREFOR

(71) Applicant: Korea University Research and Business Foundation, Seoul (KR)

(72) Inventors: Ki Bong Lee, Seoul (KR); Hyun-Min Jang, Seoul (KR); Chan-Hyun Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 14/579,701

(22) Filed: Dec. 22, 2014

(65) Prior Publication Data

US 2015/0108407 A1    Apr. 23, 2015

Related U.S. Application Data

(63) Continuation of application No. PCT/KR2013/005515, filed on Jun. 21, 2013.

(30) Foreign Application Priority Data

Jun. 22, 2012 (KR) .................. 10-2012-0067576
Jun. 21, 2013 (KR) .................. 10-2013-0071709

(51) Int. Cl.
*C01B 3/16* (2006.01)
*B01J 35/00* (2006.01)
(Continued)

(52) U.S. Cl.
CPC .............. *C01B 3/16* (2013.01); *B01J 20/041* (2013.01); *B01J 20/06* (2013.01); *B01J*
(Continued)

(58) Field of Classification Search
CPC ...... B01J 35/0006; B01J 23/007; B01J 23/74; B01J 23/42; B01J 20/041; B01J 20/06; C01B 3/58
See application file for complete search history.

(56) References Cited

U.S. PATENT DOCUMENTS

2008/0039665 A1    2/2008  Brown et al.

OTHER PUBLICATIONS

Jang et al. "High-purity hydrogen production through sorption enhanced water gas shift reaction using K2CO3-promoted hydrotalcite", May 7, 2012, Chemical ENgineering Science, 73, 431-438.*
Vaporciyan et al. "Periodic Separating Reactors: Experiments and Theory", 1989, Aiche, vol. 35, No. 5, 831-844.*
(Continued)

*Primary Examiner* — Stanley Silverman
*Assistant Examiner* — Syed Iqbal
(74) *Attorney, Agent, or Firm* — Mintz Levin Cohn Ferris Glovsky and Popeo, P.C.; Kongsik Kim; Jonathon Western

(57) ABSTRACT

The present invention relates to an apparatus that produces a high-purity gas and to a method of producing a high-purity gas using the apparatus. An apparatus for producing a high-purity gas according to an embodiment of the invention may include a column configured to perform a sorption-enhanced reaction for removing a reaction by-product produced through a catalyst reaction by using sorption, where the column is divided into a multiple number of sections, and the multiple sections have decreasing proportions of a catalyst and increasing proportions of an adsorbent from a front end towards a rear end along a reaction path. According to an embodiment of the invention, a multi-section column may be applied to obtain an increased amount of gas production compared with the conventional sorption-enhanced reaction, even with the same amounts of catalyst and adsorbent.

11 Claims, 15 Drawing Sheets

(51) Int. Cl.

| | |
|---|---|
| *B01J 20/04* | (2006.01) |
| *B01J 20/06* | (2006.01) |
| *C01B 3/58* | (2006.01) |
| *C01B 3/56* | (2006.01) |
| *B01J 23/00* | (2006.01) |
| *B01J 23/42* | (2006.01) |
| *B01J 23/74* | (2006.01) |

(52) U.S. Cl.
CPC ....... 35/0006 (2013.01); *C01B 3/56* (2013.01); *C01B 3/58* (2013.01); B01J 23/007 (2013.01); B01J 23/42 (2013.01); B01J 23/74 (2013.01); C01B 2203/0283 (2013.01); C01B 2203/0425 (2013.01)

(56) References Cited

OTHER PUBLICATIONS

Carvill et al. "Sorption-Enhanced Reaction Process." *AiChe J.* 42.10(1996):2765-2772.
Choi et al. "Water Gas Shift Reaction Kinetics and Reactor Modeling for Fuel Cell Grade Hydrogen." *J. Power Sources.* 124(2003):432-439.
Han et al. "Simultaneous Shift Reaction and Carbon Dioxide Separation for the Direct Production of Hydrogen." *Chem. Eng. Sci.* 49.248(1994):5875-5883.
Jang et al. "High-Purity Hydrogen Production Through Sorption Enhanced Water Gas Shift Reaction Using K2CO3-Promoted Hydrotalcite." *Chem. Eng. Sci.* 73(2012):431-438.

* cited by examiner

HIGH-PURITY GAS PRODUCTION APPARATUS AND PRODUCTION METHOD THEREFOR

CROSS-REFERENCE TO RELATED APPLICATION

This application is a continuation of International Application No. PCT/KR2013/005515, filed on Jun. 21, 2013, which claims priority to Korean Patent Application No. 10-2012-0067576, filed on Jun. 22, 2012, and Korean Patent Application No. 10-2013-0071709, filed on Jun. 21, 2013. The applications are incorporated herein by reference.

TECHNICAL FIELD

The present invention relates to an apparatus that produces a high-purity gas and to a method of producing a high-purity gas using the apparatus.

BACKGROUND ART

With the threat of energy shortage and global warming caused by environmental pollution, recent times have seen an increasing interest in new clean energy sources. In particular, there is a growing interest in and active research focused on hydrogen energy sources. Preferably, such hydrogen sources should be produced by solar energy, wind energy, biomass, and other renewable energy sources.

Due to technological and economical limitations, however, the steam methane reforming (SMR) method is currently the most widely used, and in recent times, a method of mass-producing hydrogen has been proposed that uses coal, an existing type of fossil fuel. The advantages of using coal are that there are abundant coal deposits, the cost is low, and there are coal deposits distributed all over the world.

Referring to FIG. 1, hydrogen can be produced by way of a water-gas shift (WGS) reaction that reacts the CO of a synthesis gas obtained by the gasification of coal with steam ($CO+Steam \leftrightarrow H_2+CO_2$). However, the gases produced by the WGS reaction may include many impurities besides the desired final product of hydrogen. Thus, in order to obtain hydrogen of a high purity level, the impurities may have to be removed by a separation refining process such as condensation and pressure swing adsorption (PSA), but during this process, 10-25% of the produced hydrogen may be consumed, and waste gases may be produced including a large quantity of carbon dioxide.

In order to resolve the problems and limitations of the existing WGS reaction, the sorption-enhanced WGS (SE-WGS) reaction is recently being developed. With the SE-WGS reaction, the reaction by-product of carbon dioxide can be removed by sorption in a column at the same time a WGS reaction is being performed, as illustrated in FIG. 2, to simplify the overall process. Also, Le Chatelier's principle is used to overcome thermodynamic limitations, and the reaction is shifted towards the product side, thereby making it possible to directly produce high-purity hydrogen of a level applicable to fuel cells (CO<10 ppm) without a separate refining process.

Currently, there are efforts for commercializing the SE-WGS reaction in various countries, but prior research has mostly focused on high-temperature $CO_2$ adsorbents for application to the SE-WGS reaction and on enhancing the performance of the high-temperature $CO_2$ adsorbents, and there is generally less research being performed on the process itself.

SUMMARY

An aspect of the invention is to provide production equipment and a production method that can minimize impurities while increasing the production yield of gas by improving the process that uses a SE-WGS reaction.

Also, an aspect of the invention is to provide the conditions for an optimal environment that can increase the production yield of the gas in such production equipment.

An apparatus for producing a high-purity gas according to an embodiment of the invention may include a column configured to perform a sorption-enhanced reaction for removing a reaction by-product produced through a catalyst reaction by using sorption, where the column is divided into a multiple number of sections, and the multiple sections have decreasing proportions of a catalyst and increasing proportions of an adsorbent from a front end towards a rear end along a reaction path.

The sorption-enhanced reaction can be a sorption-enhanced water-gas shift (SE-WGS) reaction for producing hydrogen from a synthesis gas and removing a by-product of carbon dioxide.

The catalyst can be any one of platinum, nickel, cobalt, iron, zinc, aluminum, and copper or a combination thereof.

The adsorbent can be at least one of a hydrotalcite-structure adsorbent, a hydrotalcite-structure adsorbent having an alkali metal impregnated into a surface thereof, a metal-oxide-based adsorbent, $Li_2ZrO_3$, and $Na_2ZrO_3$ or a combination thereof.

The column can include two consecutive sections along a progression path.

From among the sections, a front section can have the catalyst and the adsorbent in a ratio between 6:4 and 9:1, and a rear section can have the catalyst and the adsorbent in a ratio between 4:6 and 1:9, with the ratio of the catalyst and the adsorbent for the rear section being an inverse of the ratio of the catalyst and the adsorbent for the front section.

The weight percentage of the catalyst in the front section can be determined within a range of 87% to 93% (90% with an error range of ±3%) with respect to the total amount of the catalyst and the adsorbent.

The front and rear sections can be formed with their total amounts forming a particular ratio.

The length ratio of the front section and the rear section on a reaction progression path can be within a range of 1:9 to 5:5.

The length of the front section with respect to the total length of the sections can be determined within a range of 17 to 23% (20% with an error range of ±3%).

A method for producing a high-purity gas according to an embodiment of the invention includes: a first step of providing a reaction environment in which a catalyst for a WGS reaction has a higher packing proportion than that of an adsorbent for a CO synthesis gas entering a column; and a second step of providing a reaction environment in which a proportion of the adsorbent with respect to the catalyst is gradually increased according to a progression of a reaction as the CO synthesis gas moves within the column.

The weight percentage of the catalyst with respect to the total adsorbent in the column can be between 25% and 400%.

According to an embodiment of the invention, the flexibility of the process can be increased by applying a multi-section column to the conventional SE-WGS reaction and thus increasing the operating variables.

Also, according to an embodiment of the invention, the multi-section column can be applied to increase the amount of hydrogen produced by at most about 6.3%, compared to the conventional SE-WGS reaction, using the same amounts of the catalyst and adsorbent.

Also, according to an embodiment of the invention, an increased amount of hydrogen production can be obtained compared to the conventional SE-WGS reaction, simply with an improvement in the process, so that the cost of process operation can be reduced.

DETAILED DESCRIPTION

Certain embodiments of the present invention are described below with reference to the accompanying drawings. Unless defined or stated otherwise, any term used in the description that refers to a direction is intended to mean a direction with respect to a drawing.

The present invention entails using a multi-section column for producing a high-purity gas and can be applied to a sorption-enhanced reaction, in which by-products produced from a catalyst reaction are removed by adsorption concurrently with the reaction, to increase both the purity of the product and the amount of production. Thus, an embodiment of the invention can be applied to all processes that utilize sorption-enhanced reaction.

In particular, the present invention can advantageously be applied to the SE-WGS (sorption-enhanced water-gas shift) reaction, in which a sorption-enhanced reaction removes the by-product of carbon dioxide while producing hydrogen from the supplied synthesis gas. While the descriptions below will focus on an example in which the multi-section column is applied to a SE-WGS reaction, the skilled person would understand that the invention is not limited thus.

Figure 1:
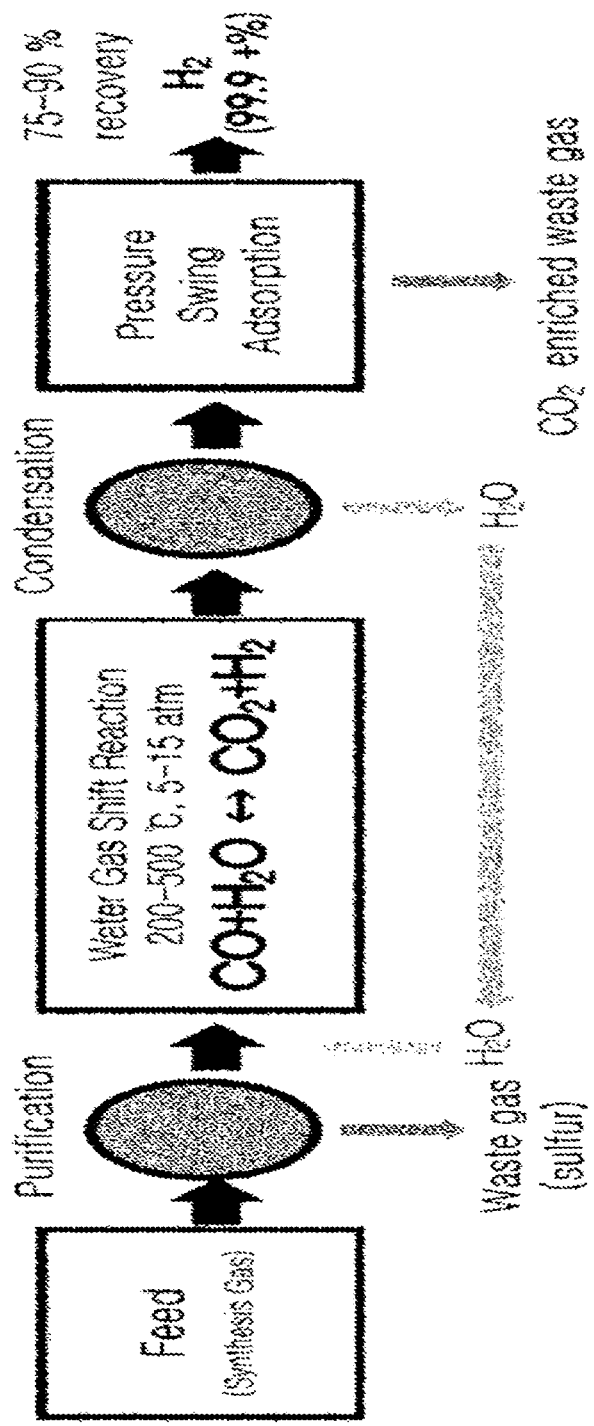
FIG. 1 is a process diagram schematically illustrating a hydrogen production process based on a WGS (water-gas shift) reaction.
Figure 2:
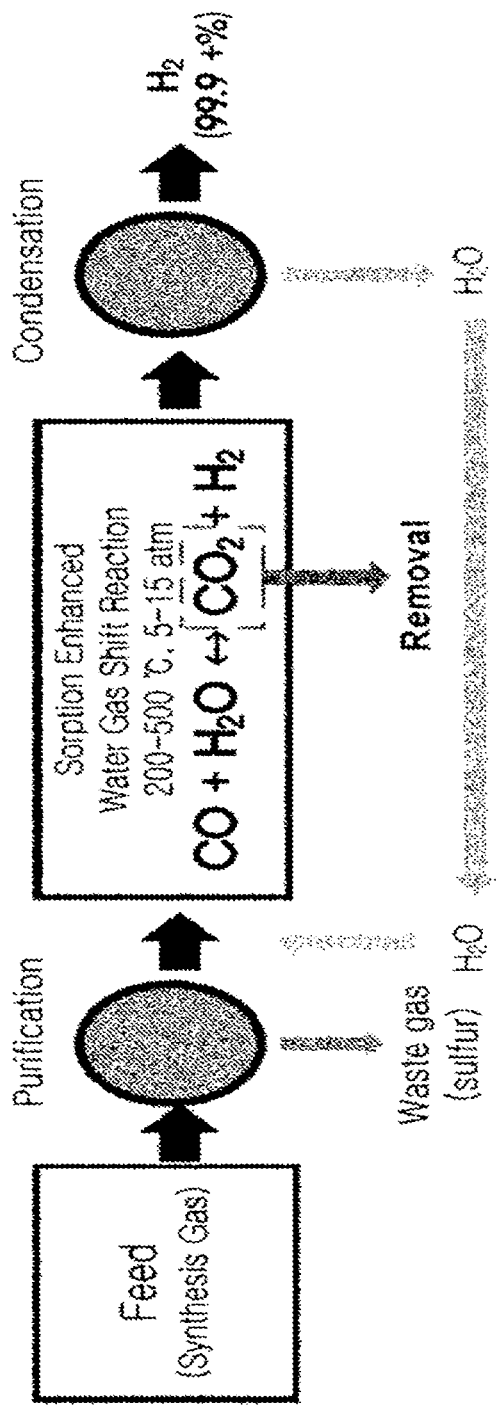
FIG. 2 is a process diagram schematically illustrating a hydrogen production process based on a SE-WGS (sorption-enhanced water-gas shift) reaction.
Figure 3A:
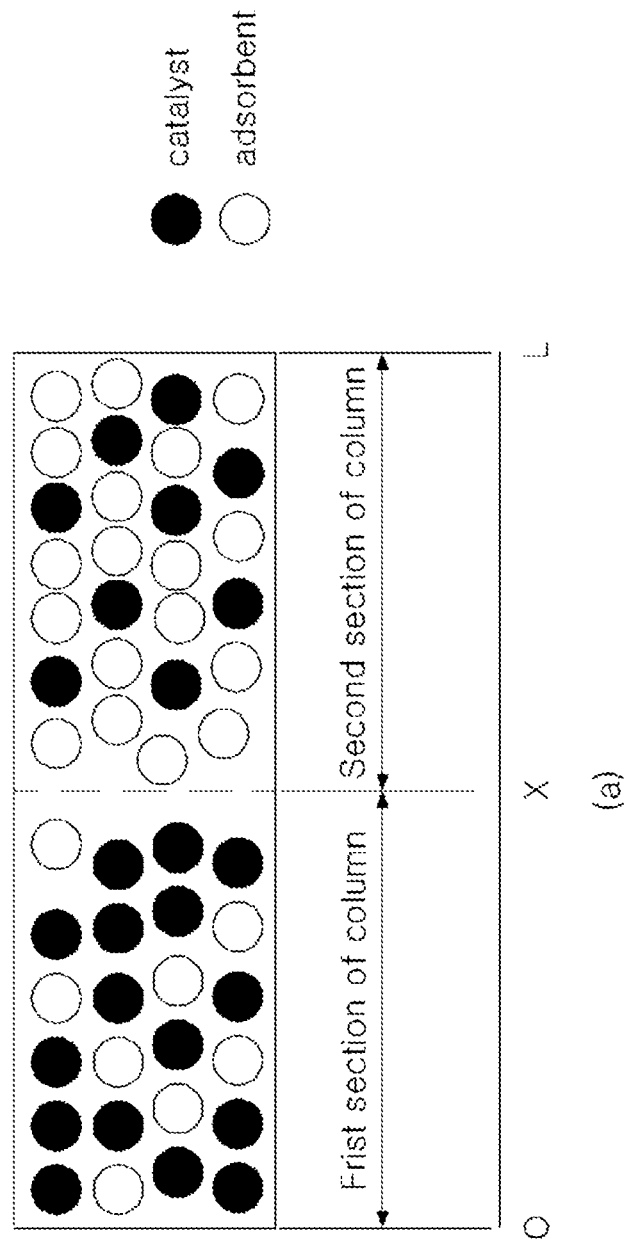
FIG. 3A is a mimetic diagram schematically illustrating a column according to an embodiment of the invention.
Figure 3B:
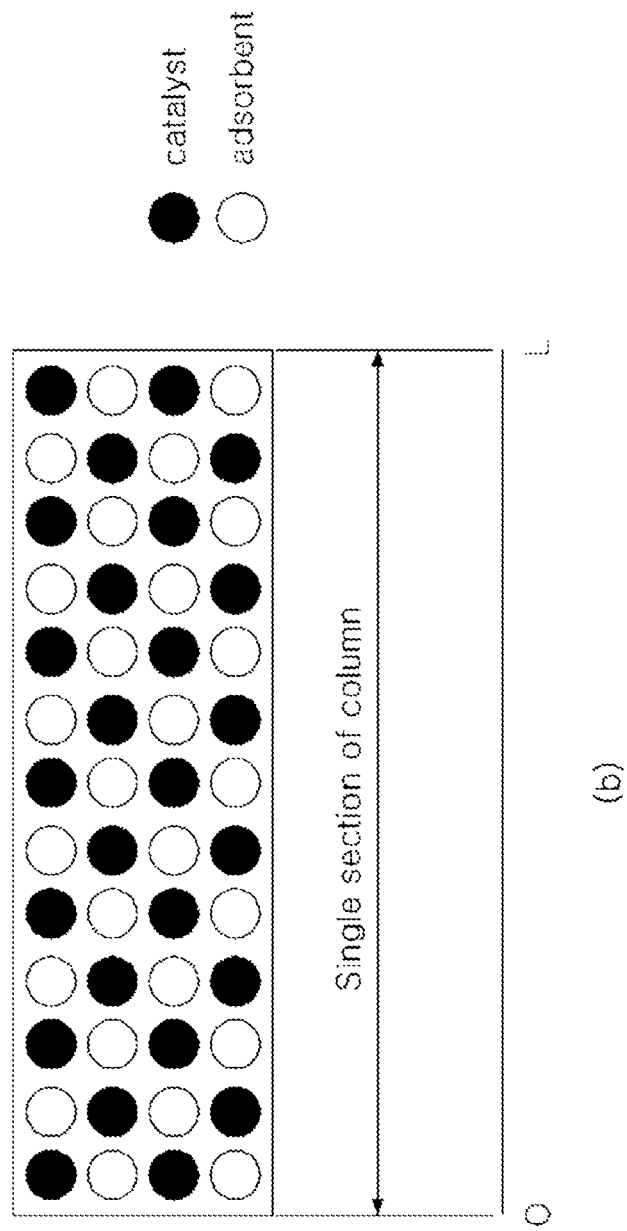
FIG. 3B is a mimetic diagram schematically illustrating a column for hydrogen production according to a comparative example.

An equipment and method for hydrogen production according to an embodiment of the invention are described with reference to FIG. 2 through FIG. 3. FIG. 2 is a process diagram schematically illustrating a hydrogen production process based on a SE-WGS (sorption-enhanced water-gas shift) reaction, FIG. 3A is a mimetic diagram schematically illustrating a column according to an embodiment of the invention, and FIG. 3B is a mimetic diagram schematically illustrating a column for hydrogen production according to a comparative example.

First, a column according to the present embodiment may use a water-gas shift (WGS) reaction for reacting with steam the CO of a synthesis gas obtained by the gasification of coal ($CO + Steam \leftrightarrow H_2 + CO_2$) to produce hydrogen and simultaneously remove carbon dioxide by using an adsorbent, as illustrated in FIG. 2.

A conventional SE-WGS reaction uses a method of packing the catalyst and the adsorbent uniformly in a particular ratio over the entire column, where the column can be regarded as having a single section. In contrast, an embodiment of the invention uses a method of dividing the conventional column into two sections and packing the catalyst and adsorbent with different proportions, based on the consideration that a WGS reaction is a very rapid reaction. That is, as illustrated in FIG. 3A, the column may be divided into a front and a rear section on the path along which the reaction progresses after the synthesis gas is flowed in. In the first section, the proportion of the catalyst may be increased, in order that the WGS reaction may take place to a sufficient degree, and in the second section, the adsorbent may be packed more than the catalyst, in order that the sorption-enhanced WGS reaction may take place to a sufficient degree, whereby the overall reactivity can be improved.

For the multiple sections according to an embodiment of the invention, the number of sections is not limited to just two as in the present embodiment, and a multiple number of two or more sections can be included. However, the multiple sections may be arranged consecutively along the reaction progression path, and the sections can have decreasing proportions of the catalyst and increasing proportions of the adsorbent from the front end towards the rear end along the reaction path.

In the descriptions that follow, a comparative example illustrated in FIG. 3B is used in which the catalyst and the adsorbent are distributed in equal proportions over the entire column. That is, the column in the comparative example can be regarded as having a single section.

A description is now provided of the test conditions and method of evaluation for the various comparative tests set forth below. To evaluate the performance of a SE-WGS reaction using a multi-section column according to an embodiment of the invention, numerical simulations were performed using MATLAB. The reaction rate equation (Equation 1) proposed by Choi and Stenger (2003) was chosen as a dynamic model for the WGS reaction, as it is generally widely used and is reported as showing good agreement with experimental results. Here, a $Cu/ZnO/Al_2O_3$ catalyst was used for the catalyst.

In other embodiments of the invention, any one of platinum, nickel, cobalt, iron, zinc, aluminum, and copper or a combination thereof can be employed as the catalyst.

$$R_{WGS} = k_0 \exp\left(-\frac{E}{RT}\right)\left(P_{CO}P_{H_2O} - \frac{P_{CO_2}P_{H_2}}{K_{WGS}}\right) \quad \text{[Equation 1]}$$

Here, $R_{WGS}$ represents the rate of the WGS reaction, $k_0$ represents the rate constant, E represents the activation energy, R represents the gas constant, T represents temperature, and $P_i$ represents the gas-phase partial pressure of component i. $K_{WGS}$ is the equilibrium constant of the WGS reaction, where the value presented in Twigg (1989) was used.

$K_2CO_3$-promoted hydrotalcite was used for the adsorbent, and the chemical adsorption equilibrium model (Equation 2) presented by Lee et al. (2007) was used for the carbon dioxide adsorption model. This model considers (i) the chemical adsorption of carbon dioxide at the adsorption site of a solid surface and (ii) the additional complexation reaction between gaseous carbon dioxide and the chemically adsorbed carbon dioxide molecules.

According to an embodiment of the invention, the adsorbent can be at least one of a hydrotalcite-structure adsorbent, a hydrotalcite-structure adsorbent having an alkali metal impregnated into a surface thereof, a metal-oxide-based adsorbent, $Li_2ZrO_3$, and $Na_2ZrO_3$ or a combination thereof.

$$n^*(P, T) = \frac{mK_C P[1 + (a+1)K_R P^a]}{1 + K_C P + K_C K_R P^{(a+1)}} \quad \text{[Equation 2]}$$

n* represents the amount of carbon dioxide adsorbed onto the sorbent in a state of equilibrium at a particular pressure P and temperature T, m represents the saturation amount of carbon dioxide adsorbed onto the surface of the sorbent, a represents the stoichiometric coefficient of the complexation reaction, and $K_C$ and $K_R$ are equilibrium constants for the surface reaction of the adsorption that are dependent on temperature and follow Equation 3 and Equation 4 shown below.

$$K_C = K_C^0 \exp\left(\frac{q_C}{RT}\right) \quad \text{[Equation 3]}$$

$$K_R = K_R^0 \exp\left(\frac{\Delta H_R}{RT}\right) \quad \text{[Equation 4]}$$

$q_c$ and $\Delta H_R$ represent the molar isosteric heat of chemisorptions and the heat of additional surface reaction, respectively. $K_C^0$ and $K_R^0$ are constants, and the parameters used for the WGS reaction rate equation and the carbon dioxide adsorption model are as shown below in Table 1.

TABLE 1

| Parameter | Value |
| --- | --- |
| $k_0$ (mmol/g · min) | $4.93 \times 10^6$ |
| E (kJ/mol) | 47400 |
| m (mol/kg) | 0.25 |
| a | $0.285 \exp\left(\frac{12.2}{RT}\right)$ |
| $K_C^0$ (atm$^{-1}$) | 0.878 |
| $K_R^0$ (atm$^{-1}$) | 0.00134 |
| $q_c$ (kJ/mol) | 21.0 |
| $\Delta H_R$ (kJ/mol) | 42.2 |

Also, for the numerical simulations of the SE-WGS reaction employing a multi-section column, the widely known CSTRs (continuous stirred tank reactors) in series model (Levenspiel, 1962) was applied. With this model, it was supposed that (i) the gases behave as ideal gases, (ii) the gas phase and solid phase within the column are at thermal equilibrium, and (iii) there is no diffusion along the axial direction and no drop in pressure within the column. The equations used for the numerical simulations are as follows.

$$N^{out} A = N^{in} A - \rho_b V_{stage}\left[\sum_j w R_{WGS,j} + \sum_j (1-w) R_{ads,j}\right] - \frac{dn_t}{dt}; \quad \text{[Equation 5]}$$

Overall molar balance in the gas phase $$\frac{dy_j}{dt} = \frac{1}{n_t}\left[N^{in} A(y_j^{in} - y_j) + \rho_b V_{stage}\{w R_{WGS,j} + (1-w) R_{ads,j}\} - y_j \rho_b V_{stage}\left\{\sum_j w R_{WGS,j} + \sum_j (1-w) R_{ads,j}\right\}\right]; \quad \text{[Equation 6]}$$

Component molar balance in the gas phase $$\eta \rho_b V_{stage} c_{ps} \frac{dT}{dt} = N^{in} A c_{pg}(T^{in} - T) - \rho_b V_{stage}\left[w \Delta H_{WGS} R_{WGS} + \sum_j (1-w) \Delta H_{ads,j} R_{ads,j}\right] + \quad \text{[Equation 7]}$$

$$\pi d_c L_{stage} U_0 (T_W - T);$$

Energy balance $$n_t = \frac{V_{stage}\varepsilon P}{RT};$$ [Equation 8]

Ideal gas law $$\frac{dn_{ads,j}}{dt} = k_{ads,j}(n^*_{ads,j} - n_{ads,j});$$ [Equation 9]

Molar balance in the solid phase (LDF model)

In the equations above, N represents the flux of the gases, A represents the cross-sectional area of the column, $\rho_b$ represents the bulk density (the catalyst and adsorbent), w represents the proportion of the catalyst in the bulk, $y_j$ represents the mole fraction of component j, and $R_{WGS}$ and $R_{ads}$ represent the rate of the WGS reaction and the rate of adsorption of $CO_2$. $\Delta H_{WGS}$ and $\Delta H_{ads}$ represent the heat of reaction of the WGS reaction and the heat of adsorption from the $CO_2$ adsorption, $L_{STAGE}$ and $V_{STAGE}$ represent the length and volume of one CSTR stage, and $C_{ps}$ and $C_{pg}$ represent the specific heat of the solid phase and the gas phase, respectively. η (=1.2) is a parameter for considering the specific heat of the heat exchanger tube. $d_c$ represents the inner diameter of the column, and $T_w$ represents the temperature of the column wall. θ represents the void fraction of the column, $n_{ads}$, $n^*_{ads}$, and $n_t$ represent the amount adsorbed onto the solid phase, the amount adsorbed on the solid phase in a state of equilibrium, and the total number of moles of the gas phase, and $k_{ads}$ is the coefficient of mass transfer in a linear driving force (LDF) model.

The results of the differential equations above were obtained by numerical analysis using MATLAB function ODE15s, and the values in the table shown below were used for the conditions of the reaction and the column in performing the numerical simulations.

TABLE 2

| Reaction and reactor Parameter | Value |
|---|---|
| N-flow (mmol/cm$^2$ · min) | 300 |
| Reaction temperature (° C.) | 200 |
| Reaction pressure (atm) | 15 |
| H$_2$O/CO ratio in feed | 3 |
| Reactor length (cm) | 500 |
| Reactor diameter (cm) | 1.73 |
| Number of stages in a reactor | 100 |
| Void fraction, e | 0.75 |
| Bulk density, pb (g/cm$^3$) | 0.824 |

<Comparative Test 1>

Figure 4:
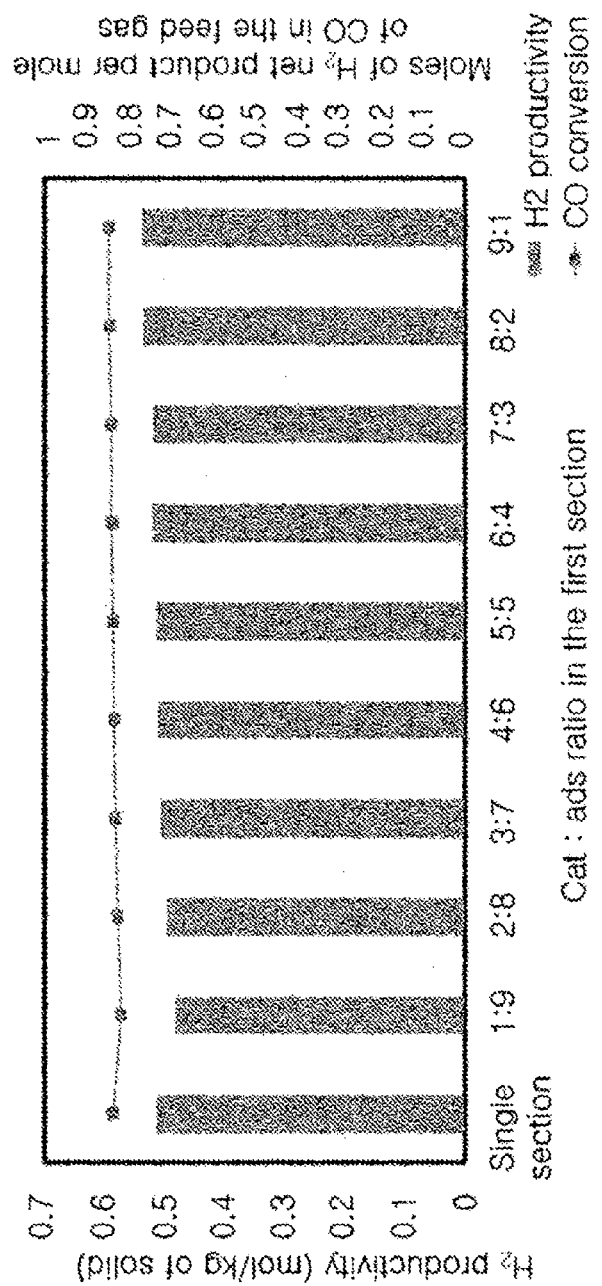
FIG. 4 is a graph comparing the amounts of hydrogen produced by the respective embodiments according to the ratio between the catalyst and the adsorbent included in each section within the column with the amount of hydrogen produced by a column according to a comparative example.
Figure 5:
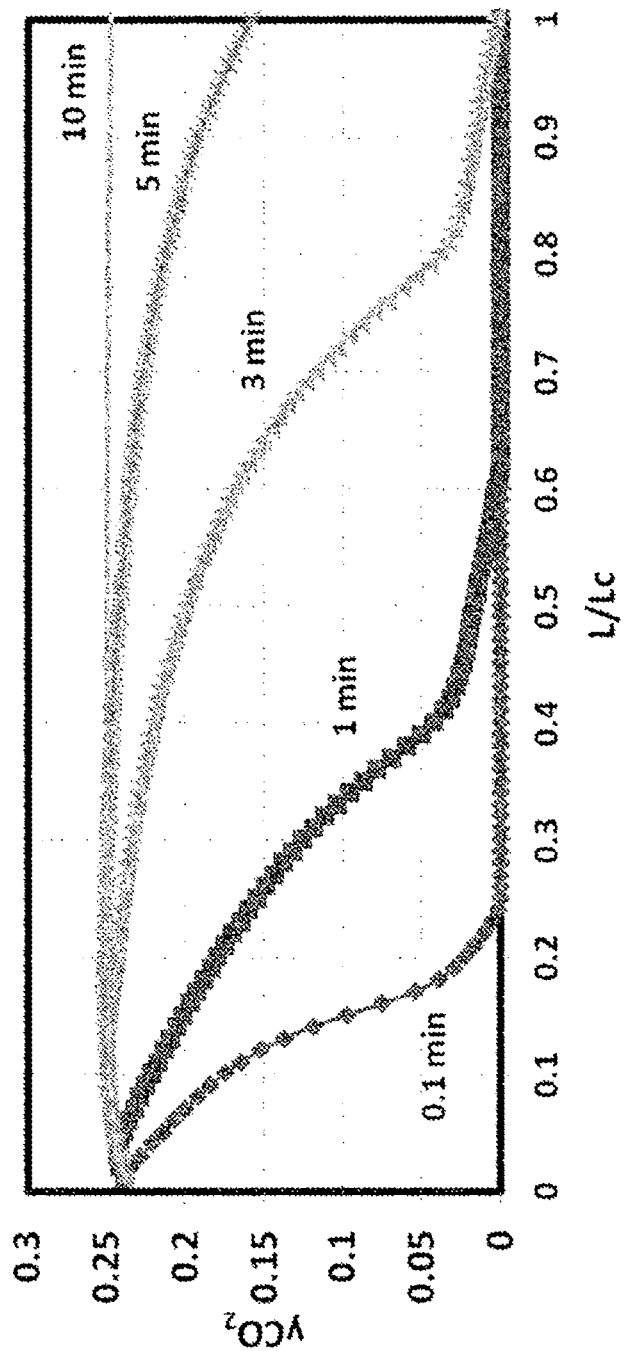
FIG. 5 is a graph illustrating the $CO_2$ concentration for each position within a column according to a comparative example.
Figure 6:
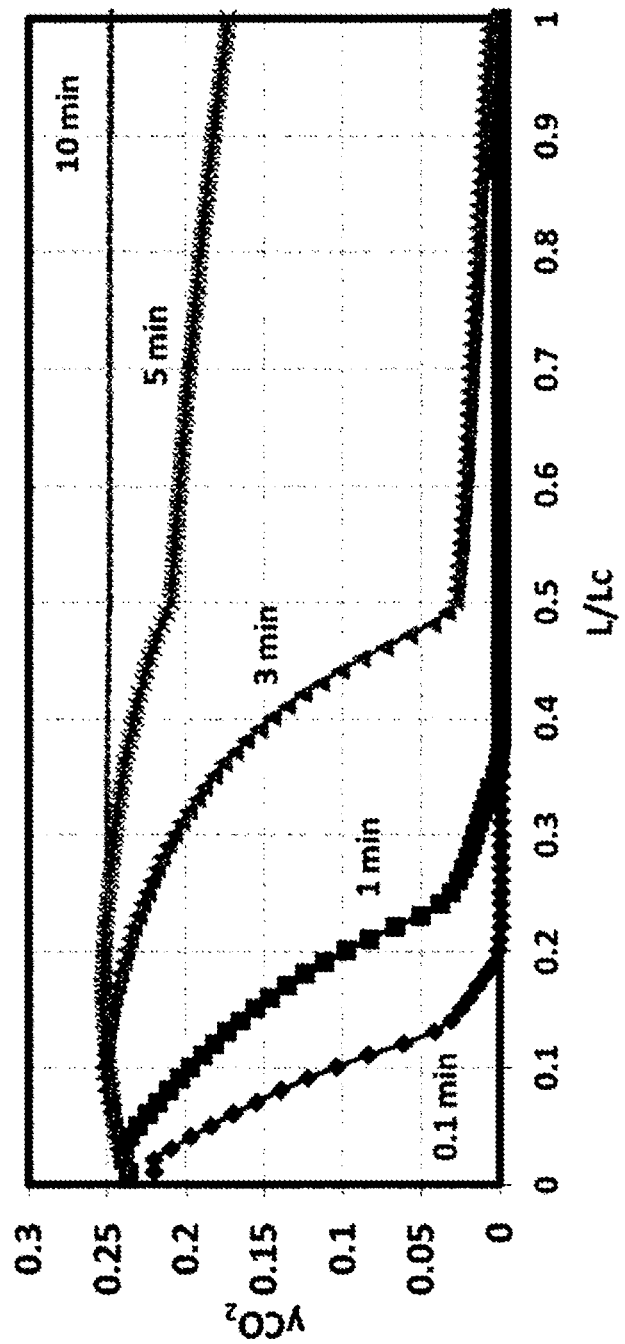
FIG. 6 is a graph illustrating the $CO_2$ concentration for each position within a column according to an embodiment of the invention in which the proportion of the catalyst in the first section is 10%.
Figure 7:
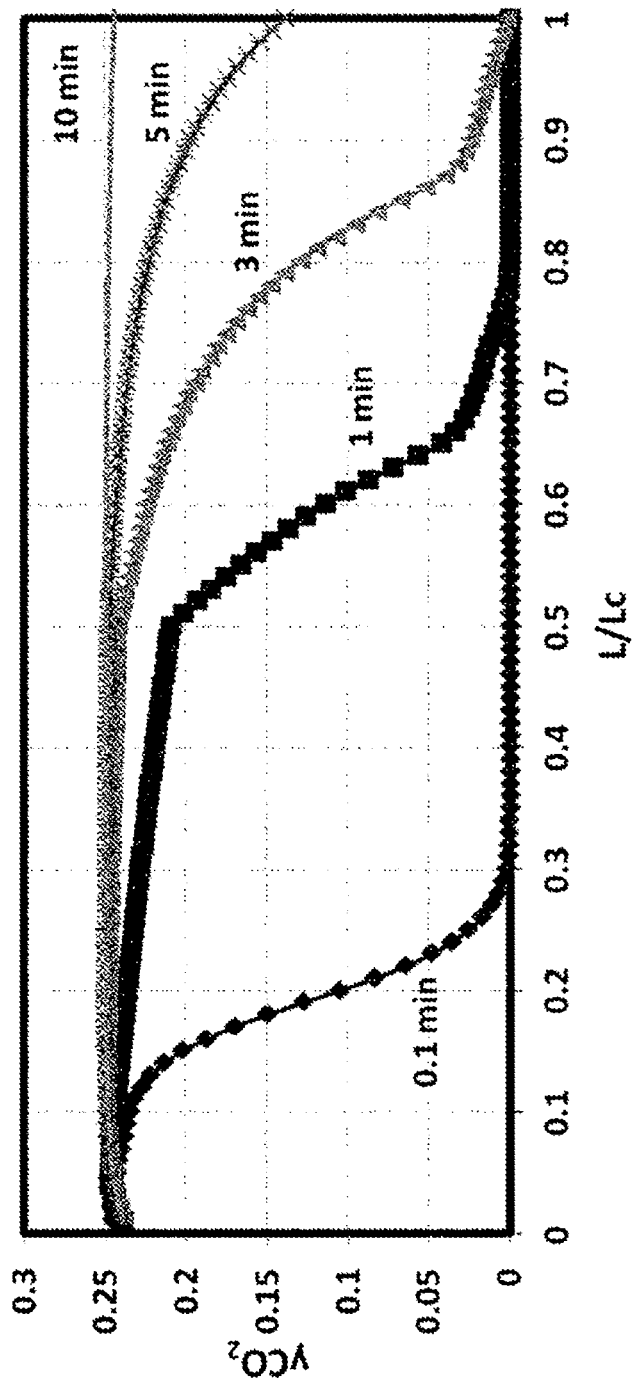
FIG. 7 is a graph illustrating the $CO_2$ concentration for each position within a column according to an embodiment of the invention in which the proportion of the catalyst in the first section is 90%.

A description of Comparative Test 1 and its results is provided below with reference to FIG. 4 to FIG. 7. FIG. 4 is a graph comparing the amounts of hydrogen produced by the respective embodiments according to the ratio between the catalyst and the adsorbent included in each section within the column with the amount of hydrogen produced by a column according to a comparative example. FIG. 5 to FIG. 7 are graphs illustrating the CO$_2$ concentration for each position within a column according to a comparative example, an embodiment of the invention in which the proportion of the catalyst in the first section is 10%, and an embodiment of the invention in which the proportion of the catalyst in the first section is 90%.

In Comparative Test 1, the ratio of the total catalyst to total adsorbent within the column was kept at 5:5, and the ratio of the lengths of the front section and rear section was kept at 5:5, after which numerical simulations were performed for the SE-WGS reaction within a multi-section column with the catalyst to adsorbent ratio varied from 1:9 to 9:1 in the sections. Here, the catalyst to adsorbent ratio of 1:9 means that in weight percentages, the weight percentage of the catalyst is 10% of the total weight of the catalyst and the adsorbent. The same applies in the descriptions that follow.

As illustrated in FIG. 4, it can be observed that greater amounts of catalyst in the front section (or greater amounts of adsorbent in the second section) result in an increased rate of CO conversion and an increased amount of H$_2$ production. In particular, the reactivity was higher compared to the comparative example when the amount of catalyst was greater than the amount of adsorbent in the front section, and the case with the catalyst packed in as 90% in the front section provided a 4.5% increase in the amount of hydrogen produced compared to the conventional method.

The cause of such reaction properties can be explained with the graphs of FIG. 5 to FIG. 7 illustrating the concentrations of carbon dioxide for each position in the column. As illustrated in FIG. 6, when the amount of catalyst is small in the front section (10% catalyst), the WGS reaction may not be achieved to a sufficient degree in the front section due to the lack of catalyst, so that the concentration of carbon dioxide is lower compared to the comparative example (see FIG. 5), whereas in the rear section, the decrease in the concentration of carbon dioxide has a gentler slope compared to the comparative example (see FIG. 5) due to the small amount of adsorbent. Thus, as the WGS reaction was not achieved to a sufficient degree, and the adsorption of carbon dioxide for overcoming the thermodynamic limitations of the reaction was not achieved effectively, either, the overall reactivity was reduced. However, with the case in which there is a sufficient amount of catalyst in the front section (90% catalyst), as illustrated in FIG. 7, the WGS reaction was achieved to a sufficient degree in the front section so that the concentration of carbon dioxide was increased, and the large amount of adsorbent in the rear section led to the active adsorption of carbon dioxide, causing a rapid decrease in carbon dioxide concentration. That is, the WGS reaction utilizing a catalyst and the adsorption of carbon dioxide for overcoming the thermodynamic limitations of the reaction were both achieved effectively, so that the overall reactivity was increased.

Summarizing the results of Comparative Test 1, in the case of a column including two sections, the amount of hydrogen production can be increased compared to the comparative example if the ratio of the catalyst to the adsorbent is between 6:4 and 9:1 in the front section and if the ratio of the catalyst to the adsorbent is between 4:6 and 1:9 in the rear section, inversely from the front section.

That is, the catalyst to adsorbent ratio of the front section can be 6:4, 7:3, 8:2, and 9:1, while the catalyst to adsorbent ratio of the front section can be 4:6, 3:7, 2:8, and 1:9.

In the front section, in particular, it could be observed that the efficiency of hydrogen production was the highest, from among the cases using the same catalyst and adsorbent, when the proportion of the catalyst with respect to the total amount of catalyst and adsorbent in the front section is within a range of 87% to 93%, considering the error range (90% with an error range of ±3%).

<Comparative Test 2>

Figure 8:
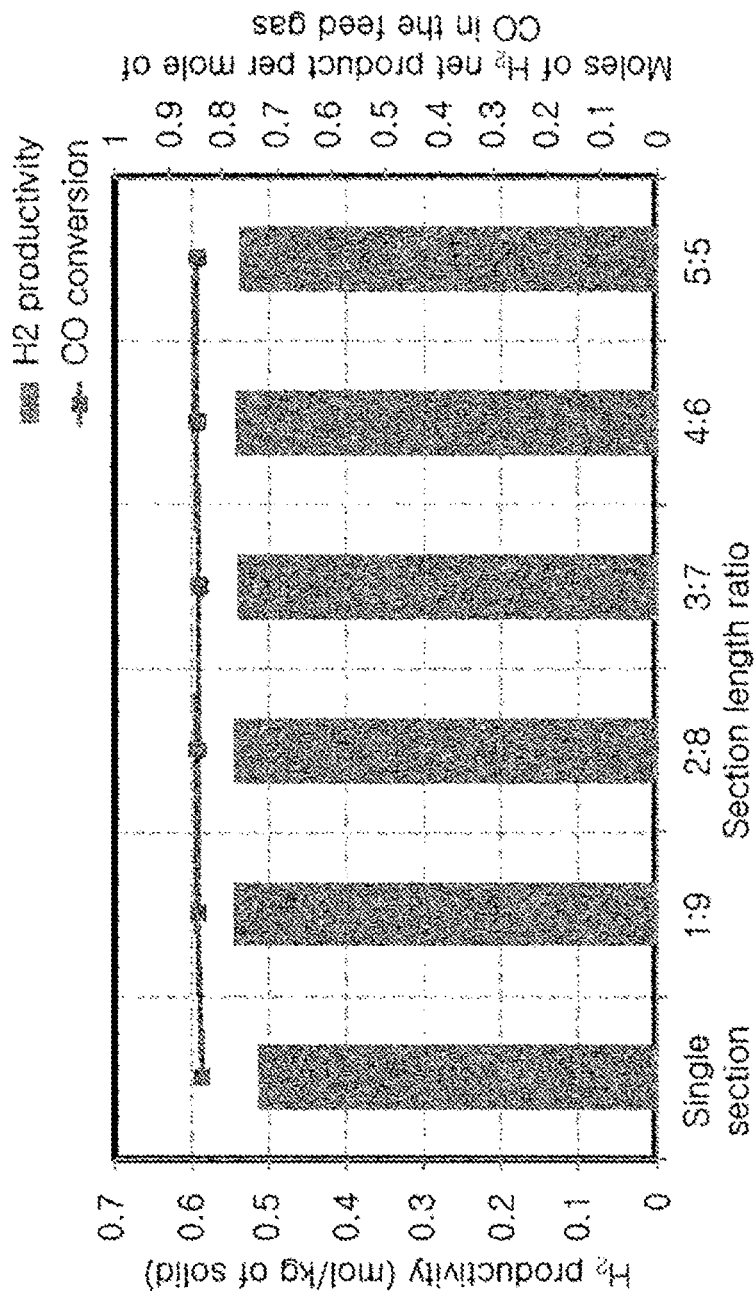
FIG. 8 is a graph illustrating the amounts of hydrogen produced from columns based on an embodiment of the invention and on a comparative example according to the length proportions of the respective sections.
Figure 9:
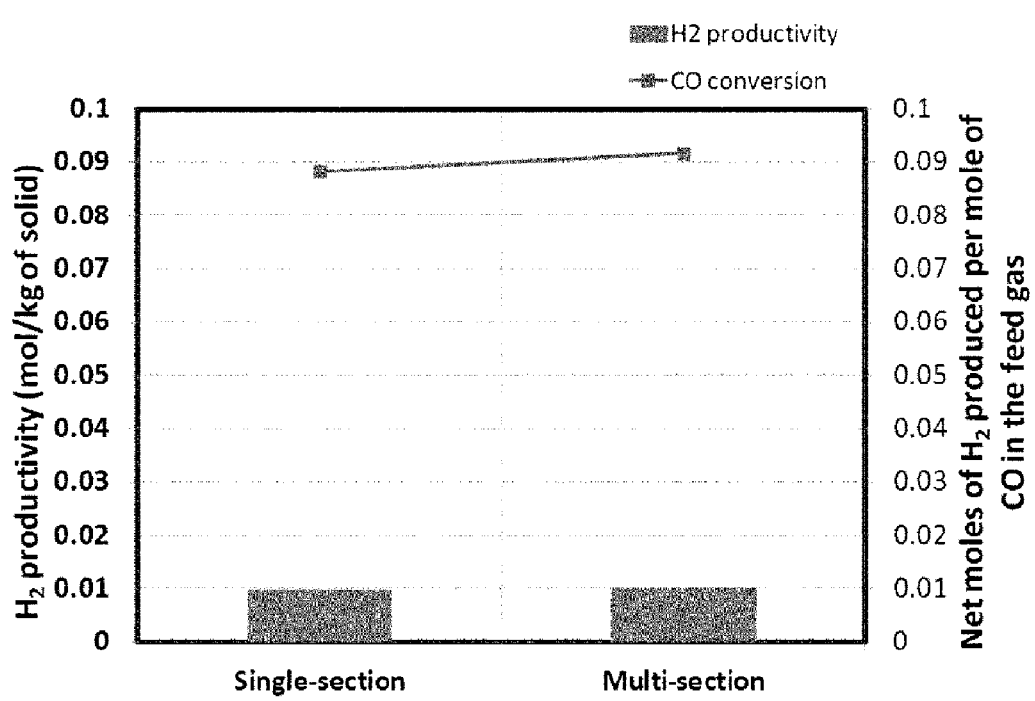
FIG. 9 is a graph comparing the amounts of hydrogen produced from columns based on a comparative example and an embodiment of the invention in which the proportion of the catalyst with respect to the adsorbent is 400%.
Figure 10:
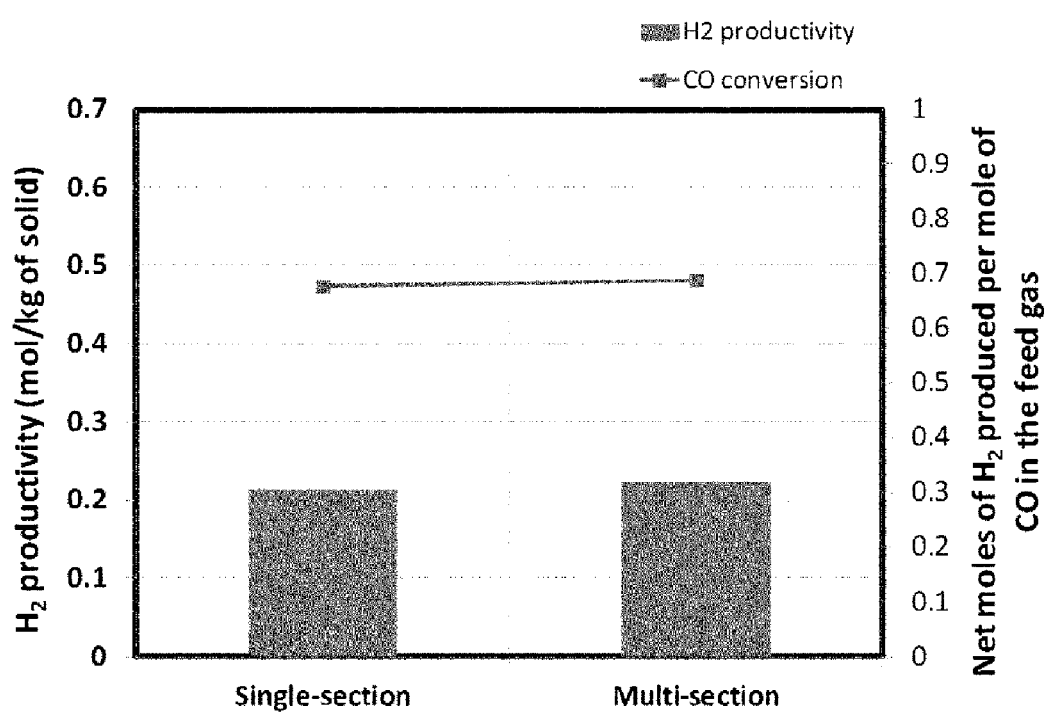
FIG. 10 is a graph comparing the amounts of hydrogen produced from columns based on a comparative example and an embodiment of the invention in which the proportion of the catalyst with respect to the adsorbent is 200%.
Figure 11:
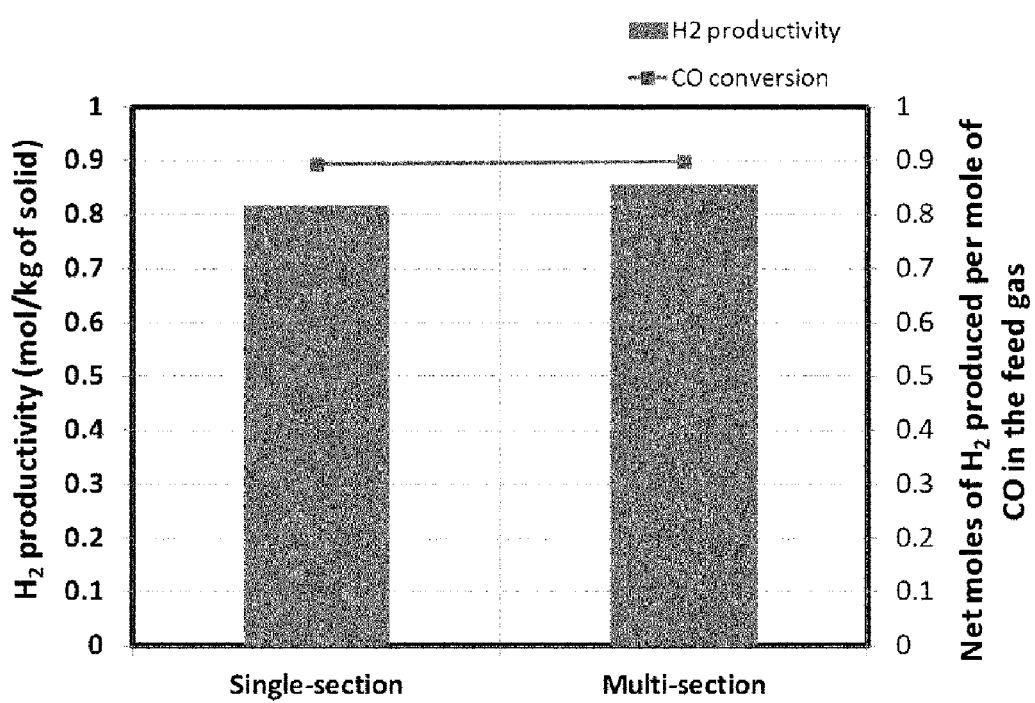
FIG. 11 is a graph comparing the amounts of hydrogen produced from columns based on a comparative example and an embodiment of the invention in which the proportion of the catalyst with respect to the adsorbent is 50%.
Figure 12:
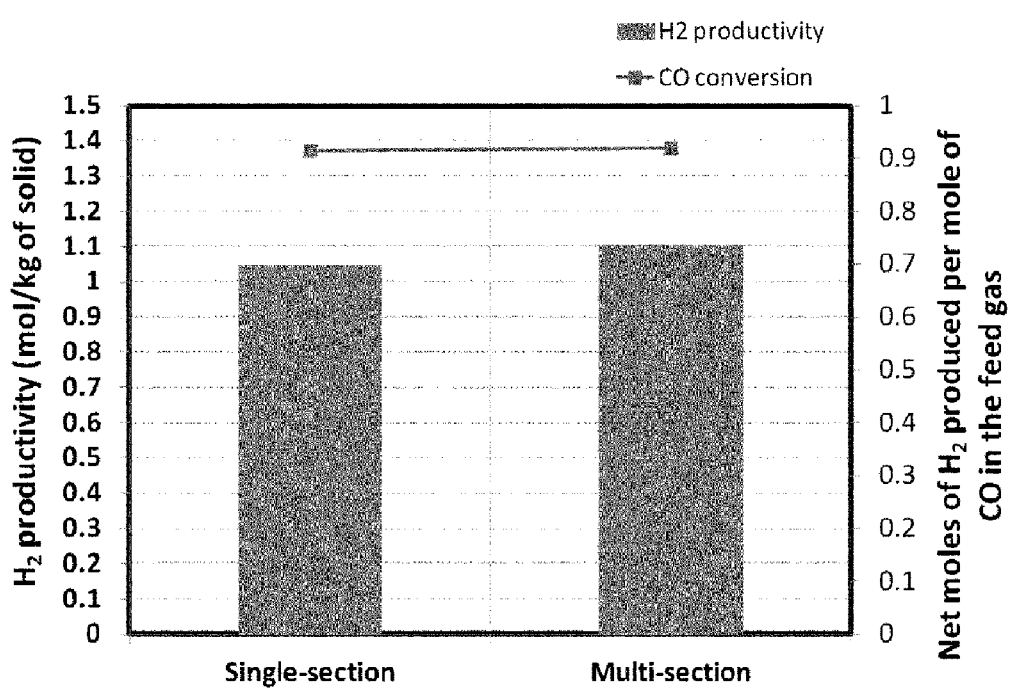
FIG. 12 is a graph comparing the amounts of hydrogen produced from columns based on a comparative example and an embodiment of the invention in which the proportion of the catalyst with respect to the adsorbent is 25%.

A description of Comparative Test 2 and its results is provided below with reference to FIG. 8. FIG. 8 is a graph illustrating the amounts of hydrogen produced from columns based on an embodiment of the invention and on a comparative example according to the length proportions of the respective sections.

In Comparative Test 2, the ratio of the total catalyst to total adsorbent within the column was kept at 5:5, and the ratio of the catalyst to adsorbent in the front section was kept at 9:1, which showed the best reactivity in Comparative Test 1, after which the reactivity in the multi-section column was observed with the ratio between the lengths of the front and rear sections varied from 1:9 to 5:5.

As illustrated in FIG. 8, all cases showed increased reactivity compared to the column based on the comparative example. In particular, the increase in the amount of hydrogen produced was the highest at 6.3% when the length ratio between the front section and rear section was 2:8, showing that there exists an optimum length ratio between the sections for maximizing hydrogen production.

Summarizing the results of Comparative Test 2, for the case in which the ratio of total catalyst to total adsorbent in the column is 5:5, and the ratio of the catalyst to the adsorbent in the front section is 1:9, it was observed that the amount of hydrogen production was increased compared to the comparative example when the length ratio between the front section and rear section on the reaction path was within a range of 1:9 to 5:5. Furthermore, the most desired effect in terms of the amount of hydrogen production could be obtained when the length of the front section was determined within a range of 17 to 23% (20% with an error range of ±3%) with respect to the overall length of the sections.

<Comparative Test 3>

A description of Comparative Test 3 and its results is provided below with reference to FIG. 9 to FIG. 12. FIGS. 9 to 12 are graphs comparing the amounts of hydrogen produced from columns based on a comparative example and an embodiment of the invention in which the proportion of the catalyst with respect to the adsorbent is 400%, 200%, 50%, and 25%, respectively.

Comparative Test 1 and Comparative Test 2 described above were performed with the ratio of total catalyst to total adsorbent within the column kept constant at 5:5. In Comparative Test 3, certain embodiments were chosen with the ratio of the catalyst to adsorbent varied, as illustrated in FIG. 9 to FIG. 12, and the amount of hydrogen production were observed. The results are as shown in Table 3 below.

TABLE 3

| Total catalyst to sorbent ratio | $H_2$ productivity increase ($10^{-3}$ × mol/kg of solid) | Rate of $H_2$ productivity increase (%) |
| --- | --- | --- |
| 4:1 | 0.28 | 2.8 |
| 2:1 | 8.7 | 4.1 |
| 1:2 | 40 | 4.9 |
| 1:4 | 59 | 5.6 |

From Table 3 above and FIG. 9 through FIG. 12, it can be seen that as the total catalyst to total sorbent ratio in the column is increased, so too are the amount of hydrogen production and the rate of CO conversion increased for the embodiments of the invention and for the comparative example. Also, it can be seen that the amount of hydrogen production and the rate of CO conversion of each embodiment are higher than the amount of hydrogen production and the rate of CO conversion of the comparative example. In all of the graphs, the rates of CO conversion were increased by about 1.0% compared to the comparative example, and the amounts of hydrogen produced were also higher with the embodiments of the invention compared to the comparative example.

Figure 13:
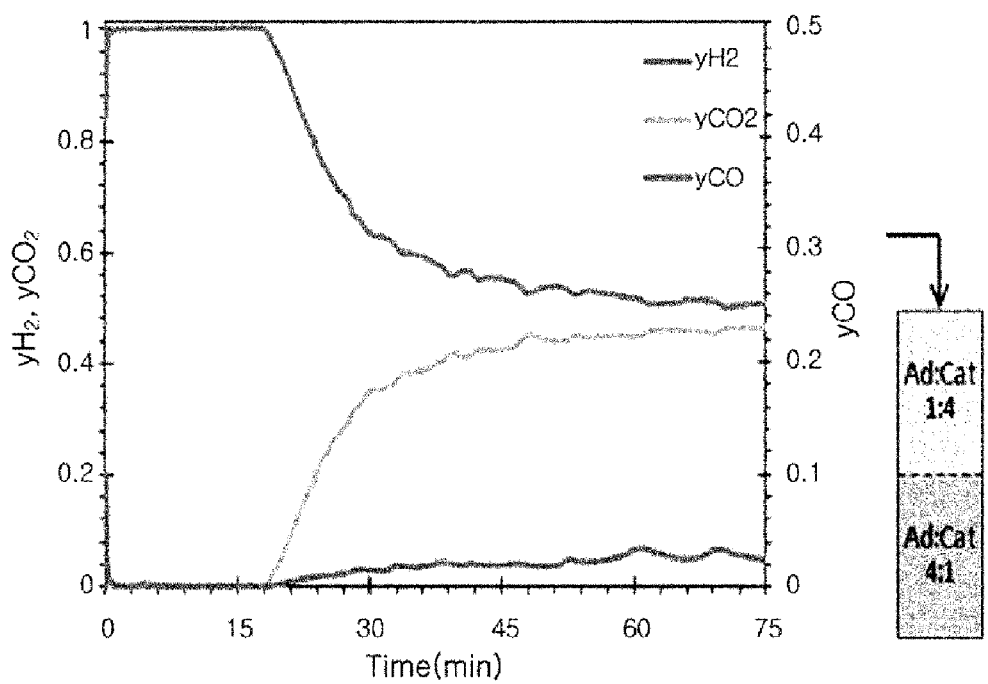
FIG. 13 is a graph illustrating the amount of hydrogen produced when the ratio between the total masses of the catalyst and the adsorbent is 5:5 and the catalyst to adsorbent ratios in the first section and second section are 1:4 and 4:1, respectively.
Figure 14:
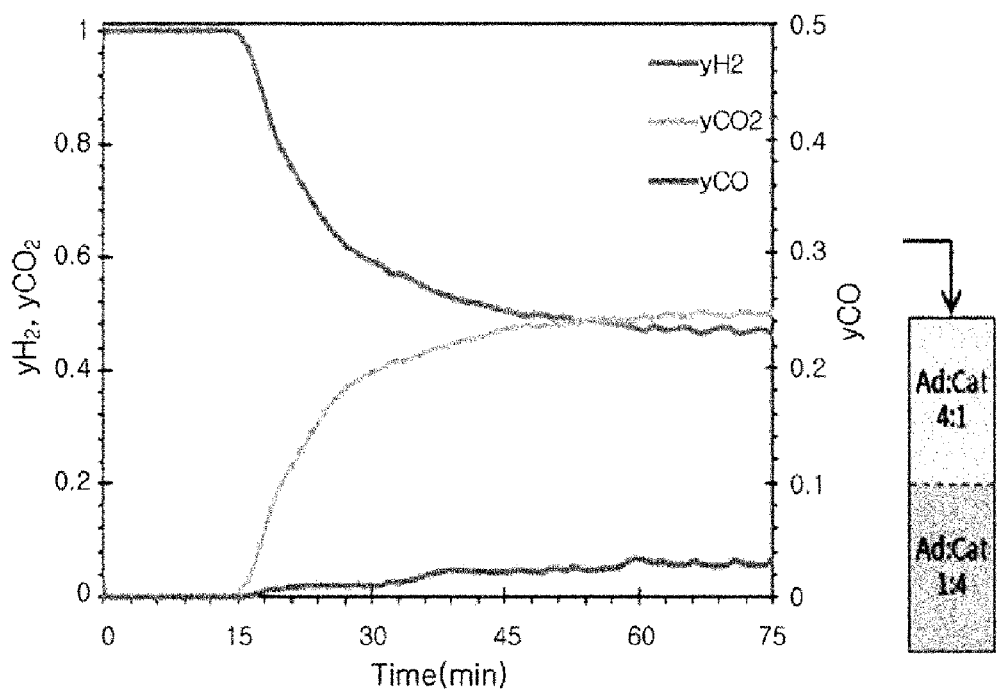
FIG. 14 is a graph illustrating the amount of hydrogen produced when the ratio between the total masses of the catalyst and the adsorbent is 5:5 and the catalyst to adsorbent ratios in the first section and second section are 4:1 and 1:4, respectively.

FIG. 13 is a graph illustrating the amount of hydrogen produced when the ratio between the total masses of the catalyst and the adsorbent is 5:5 and the catalyst to adsorbent ratios in the first section and second section are 1:4 and 4:1, respectively, and FIG. 14 is a graph illustrating the amount of hydrogen produced when the ratio between the total masses of the catalyst and the adsorbent is 5:5 and the catalyst to adsorbent ratios in the first section and second section are 4:1 and 1:4, respectively.

FIG. 13 and FIG. 14 show the results of actual SE-WGS experiments conducted with different packing conditions for evaluating the effect of multi-section packing according to an embodiment of the invention.

In the actual SE-WGS experiments, reactions were triggered with 12 vol. % of CO entering in a flow rate of 0.030 splm at 300° C.

To increase reactivity, the ratio of steam to CO was kept at 3:1, and the adsorbent and the catalyst were reduced by high-purity hydrogen flowing at 500° C. for 8 hours before the reactions.

A one-body hybrid solid each fabricated with different proportions of the absorbent and catalyst was fabricated as a cylindrically shaped pellet by using a pelletizer. To fabricate the one-body hybrid solids, the adsorbent and the catalyst in ratios of 1:4 and 4:1, respectively, were evenly mixed by ball-milling, and then were fabricated as pellets by using a pelletizer at a pressure of 100 mPa.

FIG. 13 illustrates the test results obtained with the adsorbent to catalyst ratio of 1:4 in the first section and the adsorbent to catalyst ratio of 4:1 in the second section, while FIG. 14 illustrates the test results with the column flipped such that the adsorbent to catalyst ratio is 4:1 in the first section and the adsorbent to catalyst ratio is 1:4 in the second section. Here, the total masses of the catalyst and the adsorbent are the same at 5:5.

From FIG. 13, it can be seen that, when the column is packed such that there is more of the catalyst in the first section and more of the adsorbent in the second section, high-purity hydrogen was produced by the sorption-enhanced reaction for about 18 minutes.

Conversely, from FIG. 14, it can be seen that, when the column is packed such that there is more of the adsorbent in the first section and more of the catalyst in the second section, high-purity hydrogen was produced by the sorption-enhanced reaction for about 15 minutes.

The results above show that even when the same amounts of catalyst and adsorbent are packed, a greater amount of high-purity hydrogen can be produced according to the packing method used.

From the results of the multi-section packing tests obtained above, it can be observed that the method of multi-section packing can produce high-purity hydrogen for about a 20% longer time, where packing a larger amount of the catalyst than the adsorbent in the first section can promote the hydrogen-producing reaction as the water-gas shift reaction having high reactivity occurs and the reaction by-product of CO2 is removed simultaneously, and packing a larger amount of the adsorbent than the catalyst in the second section can quickly remove the CO2 produced at the rear end of the column.

Conversely, if there are a relatively smaller amount of catalyst in the first section and a relatively smaller amount of adsorbent in the second section so that the reaction by-product of CO2 is not effectively removed, the overall SE-WGS reaction may not be achieved to a relatively sufficient degree.

Certain preferred embodiments of the present invention have been described above, but the technical spirit of the invention is not limited to the embodiments above. Various apparatuses and methods for producing high-purity hydrogen can be implemented without departing from the technical spirit specified by the scope of claims below.

The invention claimed is:

1. An apparatus for producing a high-purity gas, the apparatus comprising:
   a column configured to perform a sorption-enhanced reaction for removing a reaction by-product produced through a catalyst reaction by using an adsorbent, wherein
   the column is divided into a front section and a rear section on a path along which the reaction progresses after a synthesis gas flows in,
   the front section include a catalyst and the adsorbent in a ratio between 6:4 and 9:1, and
   the rear section includes the catalyst and the adsorbent in a ratio between 4:6 and 1:9, the ratio of the catalyst and the adsorbent for the rear section being an inverse of the ratio of the catalyst and the adsorbent for the front section.

2. The apparatus for producing a high-purity gas according to claim 1, wherein the sorption-enhanced reaction is a sorption-enhanced water-gas shift (SE-WGS) reaction for producing hydrogen from the synthesis gas and removing a by-product of carbon dioxide.

3. The apparatus for producing a high-purity gas according to claim 1, wherein the catalyst is any one of platinum, nickel, cobalt, iron, zinc, aluminum, and copper or a combination thereof.

4. The apparatus for producing a high-purity gas according to claim 1, wherein the adsorbent is at least one of a hydrotalcite-structure adsorbent, a hydrotalcite-structure adsorbent having an alkali metal impregnated into a surface thereof, a metal-oxide-based adsorbent, $Li_2ZrO_3$, and $Na_2ZrO_3$ or a combination thereof.

5. The apparatus for producing a high-purity gas according to claim 1, wherein the column includes two consecutive sections along a progression path.

6. The apparatus for producing a high-purity gas according to claim 1, wherein a proportion of the catalyst in the front section is determined within a range of 87 weight % to 93 weight % with respect to a total amount of the catalyst and the adsorbent.

7. The apparatus for producing a high-purity gas according to claim 1, wherein the front and rear sections are formed with total amounts forming a particular ratio.

8. The apparatus for producing a high-purity gas according to claim 7, wherein a length ratio on a reaction progression path of the front section and the rear section is within a range of 1:9 to 5:5.

9. The apparatus for producing a high-purity gas according to claim 8, wherein a length of the front section is determined within a range of 17 to 23% with respect to a total length of the sections.

10. A method for producing a high-purity gas, the method comprising:
    a first step of providing a reaction environment in which a catalyst for a WGS reaction has a higher packing proportion than that of an adsorbent for a CO synthesis gas entering a column; and
    a second step of providing a reaction environment in which a proportion of the adsorbent with respect to the catalyst is gradually increased according to a progression of a reaction as the CO synthesis gas moves within the column, wherein
    the column is divided into a front section and a rear section on a path along which the reaction progresses after the CO synthesis gas flows in,
    the front section includes the catalyst and the adsorbent in a ratio between 6:4 and 9:1, and
    the rear section includes the catalyst and the adsorbent in a ratio between 4:6 and 1:9, the ratio of the catalyst and the adsorbent for the rear section being an inverse of the ratio of the catalyst and the adsorbent for the front section.

11. The method for producing a high-purity gas according to claim 10, wherein a proportion of the catalyst with respect to the total adsorbent in the column is between 25 weight % to 400 weight %.

* * * * *